US012644504B1

(12) United States Patent
Singh

(10) Patent No.: US 12,644,504 B1
(45) Date of Patent: Jun. 2, 2026

(54) TWO SPEED GEAR REDUCER FOR ELECTRIC DRIVE MODULE

(71) Applicant: FCA US LLC, Auburn Hills, MI (US)

(72) Inventor: Tejinder Singh, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/079,969

(22) Filed: Mar. 14, 2025

(51) Int. Cl.
*F16H 3/66* (2006.01)
*F16H 57/037* (2012.01)
*H02K 7/00* (2006.01)
*H02K 7/116* (2006.01)
*F16H 57/02* (2012.01)

(52) U.S. Cl.
CPC ............. *F16H 3/66* (2013.01); *F16H 57/037* (2013.01); *H02K 7/006* (2013.01); *H02K 7/116* (2013.01); *F16H 2057/02034* (2013.01); *F16H 2057/02043* (2013.01); *F16H 2200/0021* (2013.01); *F16H 2200/0034* (2013.01); *F16H 2200/201* (2013.01); *F16H 2200/2035* (2013.01); *F16H 2200/2064* (2013.01)

(58) Field of Classification Search
CPC ...................... F16H 3/66; F16H 57/037; F16H 2057/02034; F16H 2057/02043; F16H 2200/0021; F16H 2200/0034; F16H 2200/201; F16H 2200/2035; F16H 2200/2064; H02K 7/006; H02K 7/116
See application file for complete search history.

(56) References Cited

U.S. PATENT DOCUMENTS

| | | | | |
|---|---|---|---|---|
| 4,702,125 A | * | 10/1987 | Kalns | F16H 37/082 475/287 |
| 11,828,351 B1 | * | 11/2023 | Mock | B60K 1/00 |
| 2006/0025265 A1 | * | 2/2006 | Sowul | B60K 6/387 475/5 |
| 2009/0275438 A1 | * | 11/2009 | Kersting | B60K 6/445 903/910 |
| 2010/0184556 A1 | * | 7/2010 | Kim | F16H 3/663 475/276 |
| 2024/0317235 A1 | * | 9/2024 | Lee | B60W 10/115 |
| 2024/0401680 A1 | * | 12/2024 | Schilder | B60K 1/00 |

* cited by examiner

*Primary Examiner* — Farhana Pervin
(74) *Attorney, Agent, or Firm* — Jeremy J. Klobucar

(57) ABSTRACT

An electric drive module (EDM) for an electrified vehicle includes an electric motor and a two-speed gearbox including: a housing; a first planetary gearset (PG) having a first sun gear coupled to the electric motor; a second compound PG having a second sun gear coupled to the first PG; a third PG having a third sun gear coupled to the second PG and a third planetary carrier coupled to an output of the gearbox. A first torque transfer device (TTD) selectively couples a second ring gear of the second PG to the housing; and a second TTD selectively couples a first ring gear of the first PG to the housing. The gearbox is selectively switchable among (i) a first gear where the first TTD is engaged and the second TTD is disengaged; and (ii) a second gear where the second TTD is engaged and the first TTD is disengaged.

20 Claims, 2 Drawing Sheets

TWO SPEED GEAR REDUCER FOR ELECTRIC DRIVE MODULE

FIELD

The present application generally relates to electric drive modules for electric vehicles and, more particularly, to a two-speed gear reducer for an electric drive module for an electrified vehicle.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Electric vehicles typically have single speed gearboxes, which while providing great torque capability on the road, are unable to provide sustained high torque for trail and sand driving or various other speeds. Such gearboxes may provide sustained high torque through higher ratio gearing, but this may not be ideal for meeting range and performance requirements for on-road and off-road usage. Moreover, such gearboxes often have relatively complex gearing arrangements and increased packaging constraints. Accordingly, while such conventional gearing systems do work for their intended purpose, there exists an opportunity for improvement in the relevant art.

SUMMARY

According to one example aspect of the invention, an electric drive module (EDM) is provided for an electrified vehicle and includes a housing, an electric motor and a two-speed gearbox. In one exemplary implementation, the two-speed gearbox assembly incudes: a housing; a first planetary gearset including a first sun gear, a first ring gear and a first planetary carrier, wherein the first sun gear is coupled to an output of the electric motor; a second compound planetary gearset including a second sun gear, a second ring gear and a second compound planetary carrier, wherein the second sun gear is coupled to the first carrier; a third planetary gearset including a third sun gear, a third ring gear and a third planetary carrier, wherein the third sun gear is coupled to the second sun gear, and wherein the third planetary carrier is coupled to an output of the two-speed gearbox assembly; a first torque transfer device that selectively couples the second ring gear to the housing; and a second torque transfer device that selectively couples the first ring gear to the housing. The gearbox assembly is selectively switchable among (i) a first gear where the first torque transfer device is engaged grounding the second ring gear to the housing, and the second torque transfer device is disengaged; and (ii) a second gear where the second torque transfer device is engaged grounding the first ring gear to the housing, and the first torque transfer device is disengaged.

According to one example aspect of the invention, an electrified vehicle having an electric drive module (EDM) is provided. In one exemplary implementation, the EDM incudes a housing, an electric motor and a two-speed gearbox assembly. The two-speed gearbox assembly includes: a housing; a first planetary gearset including a first sun gear, a first ring gear and a first planetary carrier, wherein the first sun gear is coupled to an output of the electric motor; a second compound planetary gearset including a second sun gear, a second ring gear and a second compound planetary carrier, wherein the second sun gear is coupled to the first carrier; a third planetary gearset including a third sun gear, a third ring gear and a third planetary carrier, wherein the third sun gear is coupled to the second sun gear, and wherein the third planetary carrier is coupled to an output of the two-speed gearbox; a first torque transfer device that selectively couples the second ring gear to the housing; and a second torque transfer device that selectively couples the first ring gear to the housing. The gearbox assembly is selectively switchable among (i) a first gear where the first torque transfer device is engaged grounding the second ring gear to the housing, and the second torque transfer device is disengaged; and (ii) a second gear where the second torque transfer device is engaged grounding the first ring gear to the housing, and the first torque transfer device is disengaged.

In some implementations, the second compound planetary carrier is coupled to the first ring gear and the third ring gear is fixed to the housing.

In some implementations, the output of the two-speed gearbox assembly is coupled to a planetary differential.

In some implementations, the planetary differential comprises a compound planetary differential having a fourth sun gear, a fourth ring gear and a fourth carrier carrying compound planetary gearsets; wherein the fourth ring gear is coupled for common rotation with the output of the two-speed gearbox assembly; and wherein the sun gear is coupled to one half shaft axle and the fourth carrier is coupled to the other half shaft axle.

In some implementations, first gear comprises a first torque multiplication and second gear comprises a second torque multiplication, and wherein the first torque multiplication is greater than the second torque multiplication.

In some implementations, the first and second torque transfer devices comprise friction clutches.

In some implementations, the first and second torque transfer devices comprise dog clutches.

In some implementations, the first torque transfer device comprises a selectable one-way clutch (SOWC).

In some implementations, the two-speed gearbox assembly comprises only three planetary gearsets consisting of the first and third planetary gearsets and the second compound planetary gearset. In some implementations, the first and third planetary gearsets comprise simple planetary gearsets.

In some implementations, the EDM comprises only one electric motor.

In some implementations, the EDM comprising a park lock gear coupled to the two-speed gearbox assembly upstream of differential and downstream of the torque transfer devices.

Further areas of applicability of the teachings of the present application will become apparent from the detailed description, claims and the drawings provided hereinafter, wherein like reference numerals refer to like features throughout the several views of the drawings. The claims form an integral part of the disclosure. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, given purely by way of non-limiting example, wherein.

DESCRIPTION

As previously discussed, an electrified vehicle that utilizes a single speed gearbox in or associated with an electric drive module (EDM) can include drawbacks such as reduced efficiency, and an inability to meet desired gradeability requirements and/or desired vehicle top speed requirements. Accordingly, an improved EDM for an electrified vehicle is provided. In one example, such an improved EDM includes a two-speed gearbox. In one example, this two-speed gearbox includes three planetary gearsets providing for three stages of gear reduction, and two torque transfer devices. In one example implementation, one of the three planetary gearsets is a compound planetary gearset and the other two planetary gearsets are simple planetary gearsets. In one example, the three stages of gear reduction provide for using only one electric motor. In one example, the two torque transfer devices are brakes. These features alone or in combination provide for a more efficient gearbox with improved NVH that can switch between the two gears all while being less complex and more compact.

Figure 1:
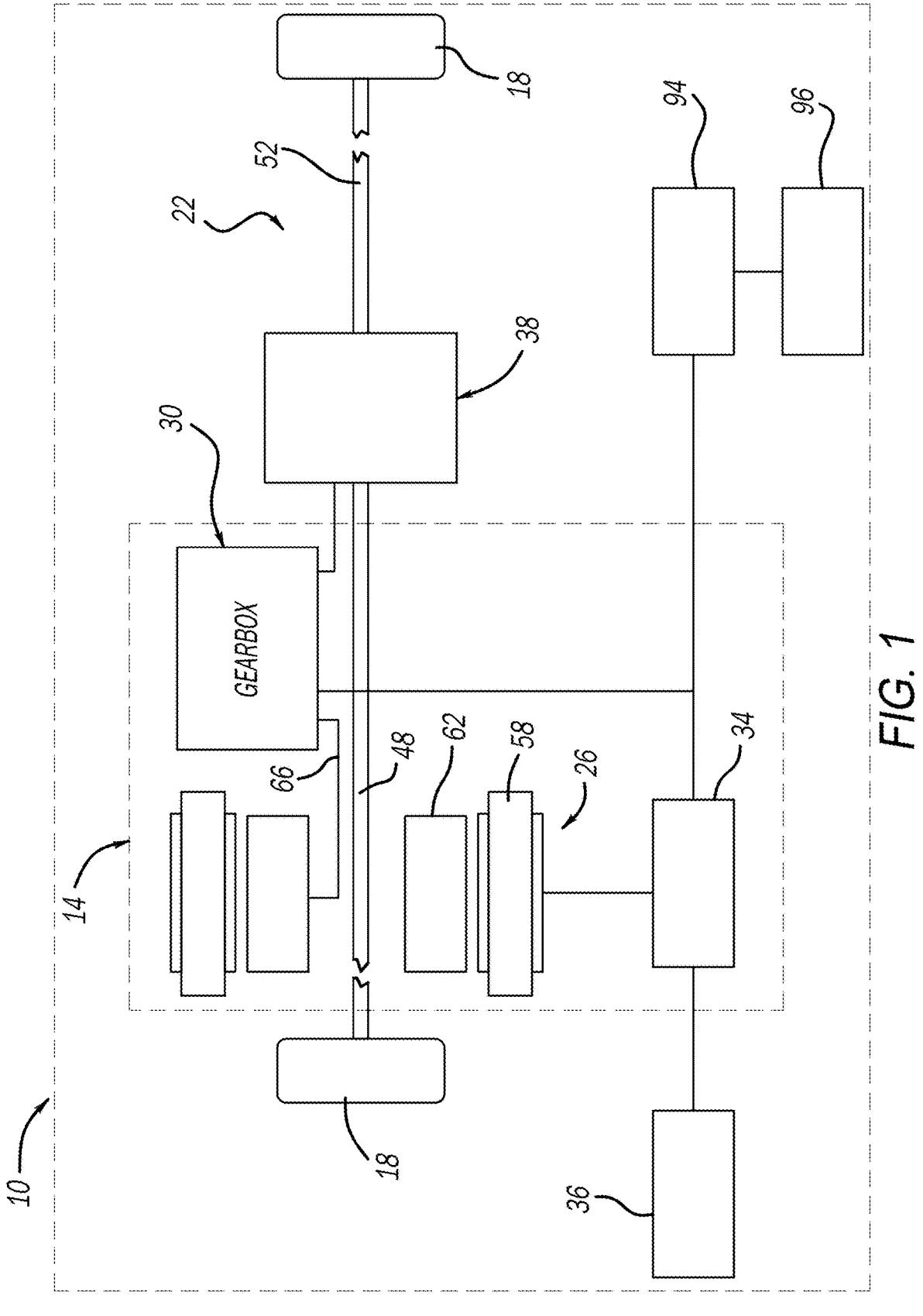
FIG. 1 is a schematic illustration of an example electric vehicle powertrain having a driveline/differential and an electric drive module with a two-speed gearbox assembly, in accordance with the principles of the present application.

With initial reference to FIG. 1, a vehicle 10 is partially shown in accordance with the principles of the present disclosure. In the example implementation illustrated, vehicle 10 includes an electric drive module (EDM) 14 configured to generate and transfer drive torque to wheels 18 via an axle or beam or one or more driveshafts or a driveline 22 for vehicle propulsion. The EDM 14 generally includes one or more electric drive units or motors 26 (e.g., electric traction motors), an electric drive gearbox assembly 30, and power electronics including a power inverter module (PIM) 34. The electric motor 26 is selectively connectable via the PIM 34 to a high voltage battery system 36 for powering at least the electric motor 26. The gearbox assembly 30 is configured to transfer the generated drive torque to the driveline 22 and can include a differential or the like 38 housed within a housing 42 of the EDM 14.

In one example implementation, the differential 38 can be external to the EDM housing 42 and separately incorporated into or with the driveline 22. Differential 38 can take the form of various types of differentials including an open differential or a locking differential such as an electrically or mechanically locking differential, and/or a planetary differential. The driveline 22 can include, such as in the example illustrated, a first or left axle shaft 48 and a second or right axle shaft 52. In the example shown, the EDM 14 is configured for use on a front axle of an electrified vehicle. It is appreciated, however, that the EDM 14 can be alternatively configured for use on a rear axle of an electrified vehicle. In other examples the EDM 14 can be provided on both of the front and rear axles for a four-wheel drive or all-wheel drive vehicle configuration.

In the example implementation illustrated, the electric motor 26 generally includes a stator 58, a rotor 62, and a rotor output or output shaft 66. The stator 58 is fixed (e.g., to housing 42) and the rotor 62 is configured to rotate relative to the stator 58 to drive the rotor shaft 66 and thus ultimately the vehicle axles 48, 52 (e.g., half shafts) and therefore drive wheels 18.

Figure 2:
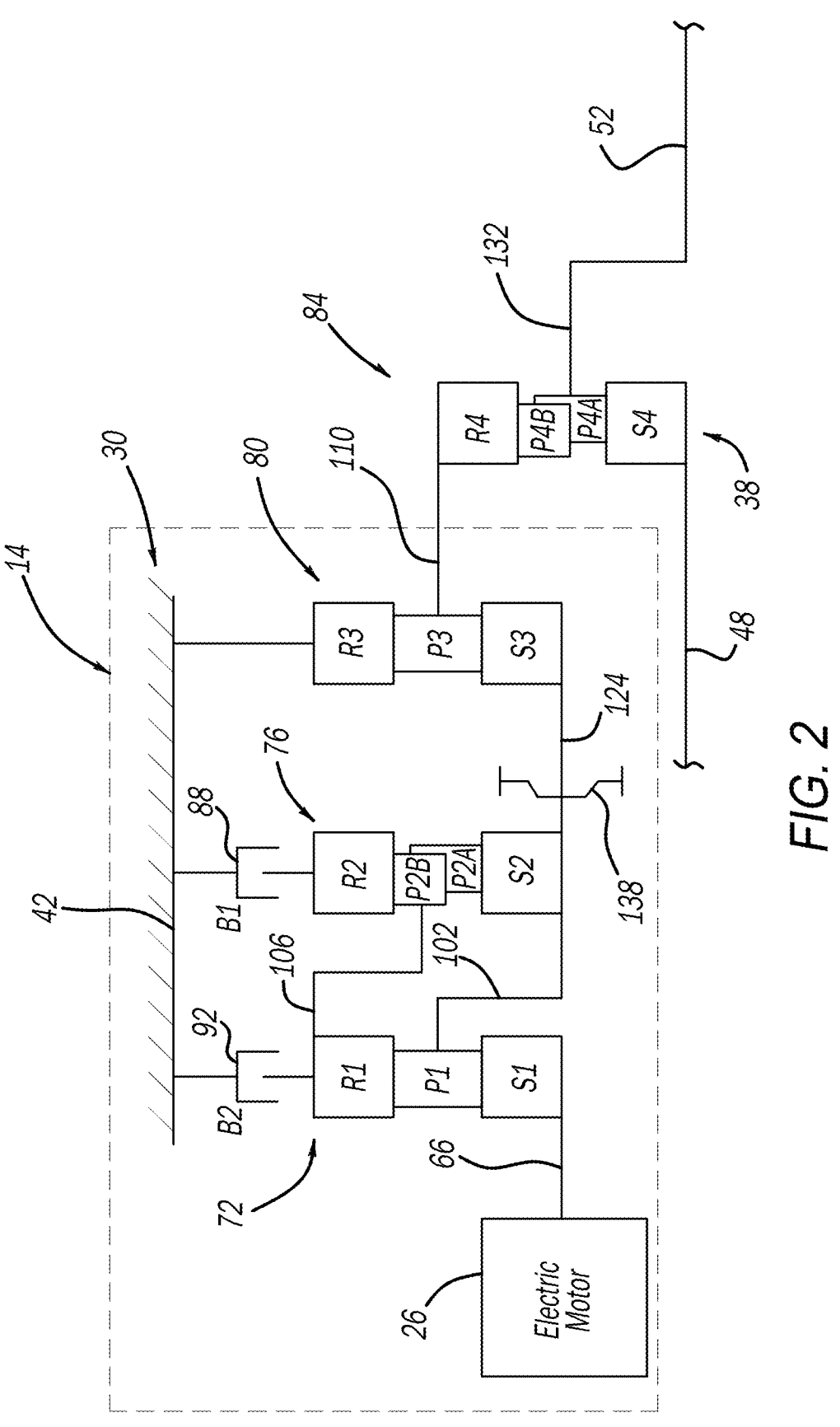
FIG. 2 is a schematic diagram of one example configuration of the two-speed gearbox assembly of FIG. 1, in accordance with the principles of the present application.

With reference now to FIG. 2 and continuing reference to FIG. 1, the two-speed gearbox assembly 30 will be described in greater detail. In the example implementation, the gearbox assembly 30 is coupled to the electric motor 26 through the rotor output shaft 66. Rotational output (torque) from the motor 26 is received via output shaft 66 by the gearbox assembly 30, which then transfers the rotational output through the differential 38 to the axles 48, 52 and wheels 18.

In the example implementation illustrated, the gearbox assembly 30 includes three planetary gearsets 72, 76 and 80, a final drive gearset 84 forming the planetary differential 38, and first and second torque transfer devices 88, 92. In one example implementation, the gearbox assembly 30 includes only the three planetary gearsets 72, 76, 80 and only the two torque transfer devices 88, 92. In this example implementation, the first torque transfer device 88 or B1 can be a controllable brake and the second torque transfer device 92 or B2 can also be a controllable brake. Both brakes are configured to be controlled to ground to the housing 42 or another suitable grounding structure. In the illustrated implementation, brakes 88, 92 can be hydraulically controlled or actuated or electronically controlled/actuated in connection with controller 94. Controller 94 can receive and process various vehicle inputs 96, such as a signal from an accelerator pedal of the vehicle. It will also be appreciated that the brakes 88, 92 may be any suitable type of clutch, brake or torque transfer devices, including dog clutches, that enables gearbox assembly 30 to function as described herein. For example, B1 and B2 can be dog clutches for range shifting or friction type clutches for power shifting. Torque transfer device 88 can also be a single one way clutch.

In the example implementation, the first planetary gearset is a simple planetary gearset having a first sun gear S1, first simple planetaries P1, a first carrier 102 and a first ring or annulus gear R1. The first planetary gearset 72 provides for a first stage of gear reduction of gearbox assembly 30. The second planetary gearset is a compound planetary gearset 76 having a second sun gear S2, a second, single carrier 106, compound planet gears or planetaries or pinions P2A and P2B, and a second ring gear R2. The second single carrier 106 rotationally supports the compound or first and second planetaries P2A and P2B. The first planetaries P2A are meshing engagement with the second sun gear S2 and the second planetaries P2B are in meshing engagement with the second ring gear R2. The first and second planetaries P2A and P2B include 3 or more sets or pairs of planetaries P2A and P2B and each set or pair is carried by the same shaft of second carrier 106. Use of the compound planetaries provides for a more compact planetary gear set. The second planetary gearset 76 provides for a second stage of gear reduction of gearbox assembly 30. The third planetary gearset is a simple planetary gearset having a third sun gear S3, third simple planetaries P3, a third carrier 110 and a third ring gear R3. The third planetary gearset 80 provides for a third stage of gear reduction of gearbox assembly 30.

The first sun gear S1 is coupled for common rotation with an input shaft 118 (and/or output 66) to gearbox assembly 30. The first ring gear R1 is coupled to second brake 92 for selective grounding to housing 42. The first planetary gearset 72 is coupled to the second planetary gearset 76 via first carrier 102 and second carrier 106. First carrier 102 is coupled for common rotation with second sun gear S2 of second planetary gearset 76. Second carrier 106 is coupled for common rotation with first ring gear R1. Second ring gear R2 is coupled to first brake 88 for selective grounding to housing 42. The second compound planetary gearset 76 is coupled to third planetary gearset 80 via a layshaft 124. Layshaft 124 couples second sun gear S2 with third sun gear S3 for common rotation. Third ring gear R3 is fixed to housing 42 and third carrier 110 forms an output, such as an output shaft coupled thereto, for connection to compound planetary differential 38.

Compound planetary differential 38 includes the compound planetary gearset 84. Planetary gearset 84 includes a fourth sun gear S4, a fourth, single carrier 132, fourth compound planet gears or planetaries or pinions P4A and P4B, and a fourth ring gear R2. The fourth single carrier 132 rotationally supports the compound or first and second planetaries P4A and P4B. The first planetaries P4A are meshing engagement with the fourth sun gear S4 and the second planetaries P4B are in meshing engagement with the fourth ring gear R4. As briefly discussed above, third carrier 110, which forms the output of the gearbox assembly 30 and EDM 14, forms the input to the planetary differential 38 by connection for common rotation with fourth ring gear R4. It will be appreciated that the connection between the third carrier 110 and the ring gear 84 may include one or more layshafts. Fourth carrier 132 and furth sun gear S4 form split outputs of the carrier differential with carrier 132 coupled for common rotation with axle shaft 52 and sun gear S4 coupled for common rotation with axle shaft 48.

In one example implementation, gearbox assembly 30 and/or EDM 14 includes a park lock 138. Park lock 138 can be positioned downstream or after the brakes 88, 92 and before the final drive gear reduction of planetary differential 38. In the example implementation illustrated, park lock is positioned on lay shaft 124 between the second and third sun gears S2, S3. Alternatively, park lock 38 could also be positioned on carrier output 110 before the planetary differential 38.

Using the EDM 14 to deliver drive torque from the electric motor 26, through the gearbox assembly 30, and to the drive wheels 18 will now be described in connection with operating modes of a first gear, a second gear and neutral. As used herein, "engage" or "activate" or "actuate" is used to mean closing a clutch or synchronizer or torque transfer device to transmit torque.

For the first gear operating mode, which results in a gear ratio multiplication greater than 1, the first brake 88 is activated or engaged and the second brake 92 is deactivated or not engaged, such as by commands from controller 94. Grounding brake 88 to housing 42 grounds second ring gear R2. Torque from electric motor 26 flows via rotor 62 and output 66 to connected sun gear 102 thereby rotationally driving sun gear 102. Sun gear 102 drives the planetary sets P1 and thus first carrier 102 and ring gear R1. Carrier 102 drives second sun gear S2 for common rotation and first ring gear R1 drives second carrier 106 for common rotation while second ring gear R2 is grounded. Second sun gear S2 drives third sun gear S3 for common rotation. Third sun gear S3 drives third planetaries P3 and thus carrier 110 against fixed ring gear R3. Driven carrier 110 drives planetary differential 84 for the final drive reduction in the manner discussed above. First gear can be a "4LO" gear. First gear can, in one exemplary implementation, provide high torque multiplication capable of meeting off road trail, and/or heavy towing, and/or vehicle recovery, and/or vehicle towing torque requirements.

For the second gear operating mode, which results in a multiplication of 1, the second brake 92 is engaged and first brake 88 is disengaged. This provides for essentially a direct drive or 1:1 torque flow of gearbox assembly 30. Torque from electric motor 26 flows via rotor 62 and output 66 to connected sun gear 102 thereby rotationally driving sun gear 102. Sun gear 102 drives the planetary sets P1 and thus first carrier 102 and ring gear R1. Carrier 102 drives second sun gear S2 for common rotation and first ring gear R1 is grounded by engaged or applied brake 92. Grounding first ring gear R1 grounds second carrier 106. Second sun gear S2 drives compound planetaries P2A, P2B and second ring gear R2. Second sun gear S2 also drives third sun gear S3 for common rotation. Third sun gear S3 drives third planetaries P3 and thus carrier 110 against fixed ring gear R3. Dirven carrier 110 drives planetary differential 84 for the final drive reduction in the manner discussed above. Second gear can be a "4HI" gear. Second gear can, in one exemplary implementation, provide torque and speed requirements for on-road driving. In one exemplary implementation, the first gear torque multiplication is greater then the second gear torque multiplication.

Described herein is an improved EDM 14 for an electrified vehicle that includes a two-speed gearbox assembly utilizing three planetary gearsets providing for three stages of gear reduction, and two torque transfer devices, thereby providing for a compact and less complex gearbox for the EDM that only requires one electric motor to meet on-road and off-road gearing drivability requirements. Further, the two speeds provide for the ability downsize the single electric motor thereby saving cost and weight. Further, the design of EDM 14 advantageously does not require individual electric drive modules for each wheel or complex controls/mechanisms.

In one example, this two-speed gearbox includes two torque transfer devices and three planetary gearsets providing for three stages of gear reduction. In one example implementation, one of the three planetary gearsets is a compound planetary gearset and the other two planetary gearsets are simple planetary gearsets. In one example, the three stages of gear reduction provide for using only one electric motor. In one example, the two torque transfer devices are brakes. These features alone or in combination provide for a more efficient gearbox with improved NVH that can switch between the two gears for on and off road driving all while being less complex and more compact.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

It will be appreciated that the term "controller" or "control system" (as well as "module" and "unit") as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or "commanding" or the like, refer to the action and processes of a computer system, or similar electronic computing device, that manipulates and transforms data represented as physical (electronic) quantities within the computer system memories or registers or other such information storage, transmission or display devices.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module (EDM) for an electrified vehicle, the EDM having an electric motor and a two-speed gearbox assembly, the two-speed gearbox assembly comprising:

a housing;

a first planetary gearset including a first sun gear, a first ring gear and a first planetary carrier, wherein the first sun gear is coupled to an output of the electric motor;

a second compound planetary gearset including a second sun gear, a second ring gear and a second compound planetary carrier, wherein the second sun gear is directly coupled to the first carrier;

a third planetary gearset including a third sun gear, a third ring gear and a third planetary carrier, wherein the third sun gear is directly coupled to the second sun gear, and wherein the third planetary carrier is coupled to an output of the two-speed gearbox assembly;

a first torque transfer device that selectively couples the second ring gear to the housing; and a second torque transfer device that selectively couples the first ring gear to the housing;

wherein the gearbox assembly is selectively switchable among (i) a first gear where the first torque transfer device is engaged grounding the second ring gear to the housing, and the second torque transfer device is disengaged; and (ii) a second gear where the second torque transfer device is engaged grounding the first ring gear to the housing, and the first torque transfer device is disengaged.

2. The EDM of claim 1, wherein the second compound planetary carrier is directly coupled to the first ring gear and the third ring gear is fixed to the housing.

3. The EDM of claim 1, wherein the output of the two-speed gearbox assembly is coupled to a planetary differential.

4. The EDM of claim 3, wherein the planetary differential comprises a compound planetary differential having a fourth sun gear, a fourth ring gear and a fourth carrier carrying compound planetary gearsets;

wherein the fourth ring gear is coupled for common rotation with the output of the two-speed gearbox assembly; and wherein the sun gear is coupled to one half shaft axle and the fourth carrier is coupled to the other half shaft axle.

5. The EDM of claim 1, wherein first gear comprises a first torque multiplication and second gear comprises a second torque multiplication; and wherein the first torque multiplication is greater than the second torque multiplication.

6. The EDM of claim 1, wherein the first and second torque transfer devices comprise friction clutches.

7. The EDM of claim 1, wherein the first and second torque transfer devices comprise dog clutches.

8. The EDM of claim 1, wherein the first and second torque transfer devices comprise brakes.

9. The EDM of claim 1, wherein the EDM comprises only one electric motor.

10. The EDM of claim 1, wherein the two-speed gearbox assembly comprises only three planetary gearsets consisting of the first and third planetary gearsets and the second compound planetary gearset.

11. The EDM of claim 10, wherein the first and third planetary gearsets comprise simple planetary gearsets.

12. The vehicle of claim 11, wherein the first torque transfer device comprises a selectable one-way clutch (SOWC).

13. The EDM of claim 1, further comprising a park lock gear coupled to the two-speed gearbox assembly upstream of differential and downstream of the torque transfer devices.

14. An electrified vehicle, comprising:

an electric drive module (EDM) including:

a housing;

an electric motor; and a two-speed gearbox assembly comprising:

a first planetary gearset including a first sun gear, a first ring gear and a first planetary carrier, wherein the first sun gear is coupled to an output of the electric motor;

a second compound planetary gearset including a second sun gear, a second ring gear and a second compound planetary carrier, wherein the second sun gear is directly coupled to the first carrier;

a third planetary gearset including a third sun gear, a third ring gear and a third planetary carrier, wherein the third sun gear is directly coupled to the second sun gear, and wherein the third planetary carrier is coupled to an output of the two-speed gearbox assembly;

a first torque transfer device that selectively couples the second ring gear to the housing; and a second torque transfer device that selectively couples the first ring gear to the housing;

wherein the gearbox assembly is selectively switchable among (i) a first gear where the first torque transfer device is engaged grounding the second ring gear to the housing, and the second torque transfer device is disengaged; and (ii) a second gear where the second torque transfer device is engaged grounding the first ring gear to the housing, and the first torque transfer device is disengaged.

15. The electrified vehicle of claim 14, wherein the second compound planetary carrier is directly coupled to the first ring gear and the third ring gear is fixed to the housing, and wherein the output of the two-speed gearbox assembly is coupled to a planetary differential.

16. The electrified vehicle of claim 15, wherein the planetary differential comprises a compound planetary differential having a fourth sun gear, a fourth ring gear and a fourth carrier carrying compound planetary gearsets;

wherein the fourth ring gear is coupled for common rotation with the output of the two-speed gearbox assembly; and wherein the sun gear is coupled to one half shaft axle and the fourth carrier is coupled to the other half shaft axle.

17. The electrified vehicle of claim 14, wherein first gear comprises a first torque multiplication and second gear comprises a second torque multiplication; and wherein the first torque multiplication is greater than the second torque multiplication.

18. The electrified vehicle of claim 14, wherein the first torque transfer device comprises a first brake and the second torque transfer device comprises a second brake.

19. The electrified vehicle of claim 14, wherein the two-speed gearbox assembly comprises only three planetary gearsets consisting of the first and third planetary gearsets and the second compound planetary gearset;

wherein the first and third planetary gearsets comprise simple planetary gearsets; and wherein the EDM comprises only one electric motor.

20. The electrified vehicle of claim 15, further comprising a park lock gear coupled to the two-speed gearbox assembly upstream of the differential and downstream of the torque transfer devices.

* * * * *